April 20, 1954   A. DEPPE   2,675,645
METHOD OF AGRICULTURAL CULTIVATION
Original Filed Feb. 6, 1948
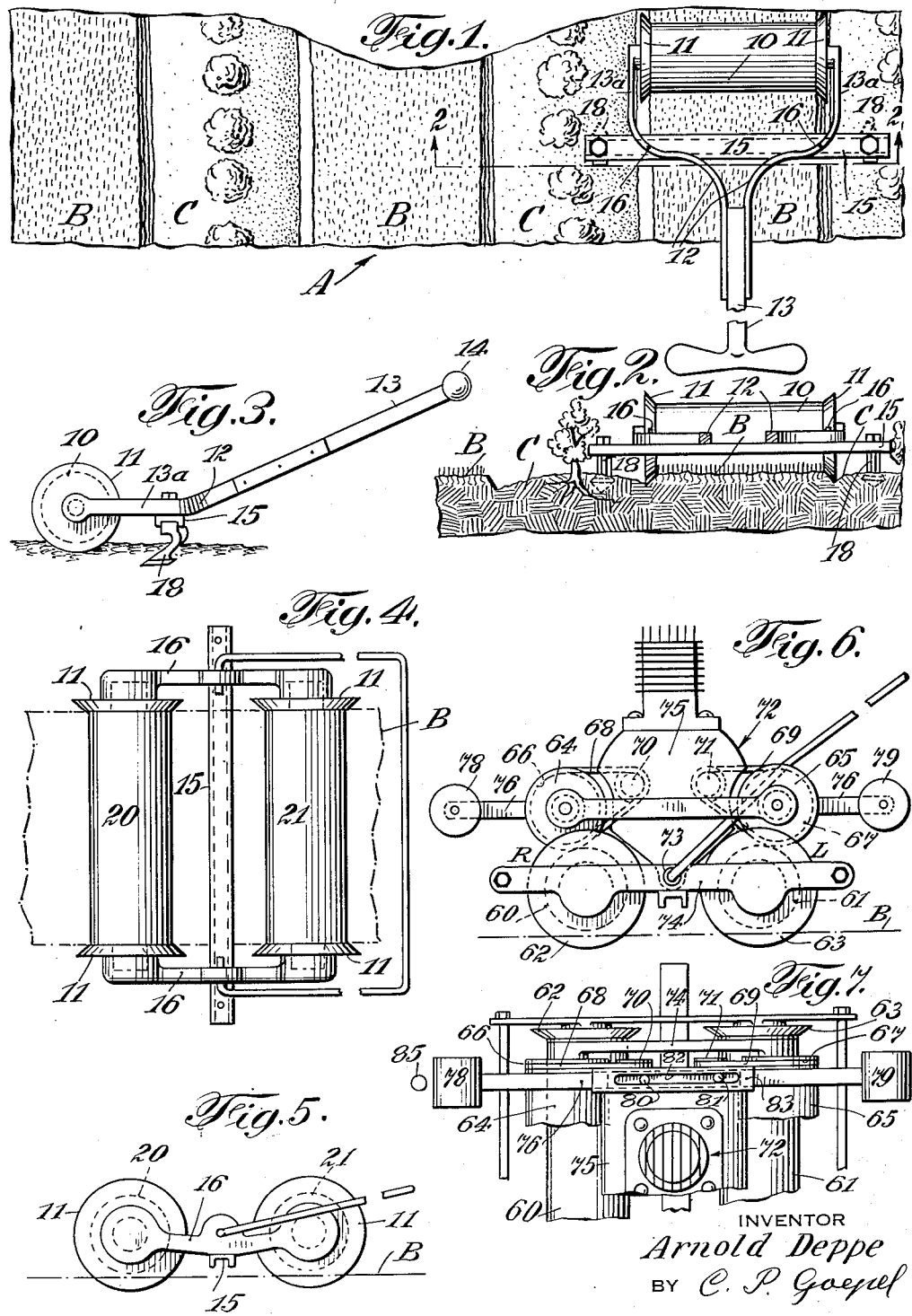
INVENTOR
Arnold Deppe
BY C. P. Goepel
his ATTORNEY Patented Apr. 20, 1954

2,675,645

UNITED STATES PATENT OFFICE 2,675,645

METHOD OF AGRICULTURAL CULTIVATION

Arnold Deppe, Pine Plains, N. Y.

Original application February 6, 1948, Serial No. 6,786. Divided and this application October 4, 1949, Serial No. 119,522

2 Claims. (Cl. 47—58)

This invention relates to improvements in the agricultural art.

The invention comprises a method of preparing land for cultivation. The land is first seeded and grown with grass, whereby larger stones or smaller trees or shrubbery are removed. Of course, where an already cultivated and grass growing plot is available, it is not necessary to first prepare the field. The invention consists in the improvement in the art, whereby such a plot is divided into strips preferably parallel to each other and each of suitable width, and then removing the grass sods from alternate strips. The open strips are then used for the growing of any suitable crop. The remaining grass grown strips are used as tracks for cultivator tractors having means to embrace the lateral walls of the grass strip or track so that the tractor is guided by the lateral edges of the strip. Tools which extend laterally from the tractor then cultivate the open strip. Such tools may be weeders, soil raisers, etc. The improved tractor is provided with one or more rollers each having a width about the width of the grass strip, and the roller serves to press the grass roots to compact them. These grass roots especially when compacted act as moisture holders, after a rain, and thus serve to keep the soil moist beneath the roots, and also keep part of the soil of the open strips relatively moist. The grass strips serve also as an antierosion means, acting as a resistance against the action of dust supporting winds, and to prevent the top soil of the open strips from being washed away. The invention then consists in the improvement in the agricultural art of providing substantially parallel strips of grass grown soil, with intervening exposed subsoil furrows, said strips being flat to guide a roller thereon, which supports cultivators for the furrow.

The invention will be more fully described hereinafter, embodiments thereof shown in the drawings, and the invention will be finally pointed out in the claims.

In the accompanying drawings,

Fig. 1 is a plan view of a part of a plot of ground, showing the alternate strips of grass grown tracks and the intervening strips of furrows to be cultivated, with an improved hand operated tractor applied thereto;

Fig. 2 is a transverse section taken on line 2—2 of Fig. 1;

Fig. 3 is a side view of one form of tractor, namely, the type shown in Figs. 1 and 2;

Fig. 4 is a plan view of a tandem roller tractor;

Fig. 5 is a side view of the same;

Fig. 6 is a side view of a mechanized unit and

Fig. 7 is a partial plan view of Fig. 6.

Similar characters of reference indicate corresponding parts throughout the various views.

Referring to the drawings, the plot of ground A of which a part is shown in Fig. 1, is divided into strips, preferably parallel with each other, one strip B being grass grown retaining all of the roots of the grass and its subsoil; and the other strip C adjacent to the grass grown strip B, having the grass sod removed to expose the subsoil to the atmosphere. The grass grown strip B is retained in that state at all times, excepting for the cutting of the grass blades, which cuttings are either left on the grass strips B, or are collected and thrown over the subsoil of the strip C, so as to cool or enrich the soil of strip C.

Rotation of crops may be carried out by changing the grass grown strips to open soil strips and vice versa. In all cases, the strips of grass grown tracks are sharply cut at their lateral margins to provide guide surfaces for the tractors.

A hand moved tractor is shown in Figs. 1 to 3. It comprises a roller 10 of the width of the grass grown strip B, with lateral guide discs 11, to move along the lateral margins of the strips B. A yoke 12 engages the ends of the roller 10, and merges into a shaft 13, terminating in a handle 14. The yoke 12 is first horizontal and then inclined upwardly, as shown in the side view of Fig. 3. To the horizontal portion 13a, a cross bar 15 is suitably secured to the yoke by bolts 16, and this cross bar extends laterally outwardly of the yoke and beyond the grass grown track B, and each end of the cross bar 15 extends over an adjacent soil strip C. Any suitable cultivator tool 18 may be applied to the cross bar 15, such as a weeder, a small soil transferrer, etc. As the tractor is guided by the roller 10 with its lateral discs 11, upon and along the grass grown strip B, the roller compacts the grass roots and acts as an efficient guide for the cultivator tools applied to the cross bar 15.

Instead of one roller 10, the tractor shown in Figs. 4 and 5 has two rollers 20 and 21, and in general is constructed like the tractor of the embodiment shown in Figs. 1, 2 and 3.

In Fig. 6 is shown a side view of a mechanized unit. The main rollers 60 and 61 have their guides 62, 63, and are rotated by friction rollers 64 and 65 which contact peripherally with the main rollers. The friction rollers 64 and 65 have grooves 66 and 67 in which belts 68 and 69 pass, either of which is driven at one time by a pulley, either 70 or 71, which is rotated by the motor 72. This motor 72 is pivoted at 73 to the frame 74. A bar 76 has abutments 78 and 79. The bar 76 is slidable and has two pins 80 and 81 which pass through a slot 82 of a plate 83 secured to the motor casing and which plate 83 supports the bar 76. When the bar 76 is moved in one direction, the motor casing is tilted in the same direction and operates the main rollers in one direction. When the bar 76 is moved in the opposite direction, the casing is tilted in the opposite direction, and the main rollers are rotated in the opposite direction. This enables the unit to automatically change its direction of movement. The bar 76 may be moved by either abutment 78 or 79 abutting against some stake 85 or the like at the end of the guideway. By a repeated to and fro movement, the soil may be given a very thorough cultivation.

From the above it is seen that the tractor having the wide rollers with their steering disks run in prefabricated tracks of earth, grass, clover or other growing plants, or may run on tracks of wood, concrete, stone, metal or other material. The tractors being guided by the steering disks run without other guide means, and automatically, in either direction.

The wide rollers preserve the grass strips and their top soil and eliminate erosion since the grass grown strips of land prevent dust conveyance by the winds.

The use of the invention is labor saving because it is only necessary to plow and cultivate that part of the field, which is actually used for the growing of the product. It saves power, only a very small power drive being required, due to the smooth surface of the roller tracks and due to the steady, precise cultivation of the same places over again. It saves labor also, because the power driven tractors work automatically and change direction automatically. Fertilizer is saved because fertilization is carried out only where it is actually needed.

Fertilizer is produced by the tracks in the form of grass clippings, which are blown or transposed to the growing plants. At the same time these grass clippings preserve the moisture on the grass grown tracks or on the open strips. Moisture is also preserved by the use of the grass grown tracks.

Implements like plows, harrows, fertilizers, sprinklers, sprayers, planters, cultivators, harvesters and others are easy to operate because the pull comes from the center of the grass grown strips and the tracks keep such implements in a precise position.

The tractors with the steering or guide disks, may utilize the roller or rollers as described with the advantages thereof, or may use wheels to convey the steering or guide disks along the edges of the grass strips. In place of rollers or wheels, Caterpillars may be used to convey the guide disks.

This is a divisional application to my pending application Serial No. 6,786 filed February 6, 1948, for Method of Agriculture Cultivation and Mechanism Therefor, which has been confined to the mechanism, and which is not claimed in this application.

I wish it to be understood that I do not desire to be limited to the exact details of construction shown and described, for obvious modifications will occur to a person skilled in the art.

I claim:

1. The method of cultivation which consists in subjecting a grass grown field to the removal of substantially parallel strips of grass sod across said field to form subsoil bed strips of a depth substantially equal to the depth of the removed sod, and of a width for the cultivation of a single row of plants in series parallel with the edge of the remaining grass grown strip, leaving remaining grass grown strips of substantially the same width, throughout the length of said field, and then subjecting each of said subsoil bed strips to a cultivation action being guided continuously along the edge and for the length of the remaining grass grown strip adjacent said subsoil bed strip, said cultivation action being controlled by the lateral edge of the remaining grass grown strip, whereby the lowest part of a subsoil bed strip is below the adjacent grass grown strips adjacent thereto for forming water channels for the absorption of the water by the grass grown strips and for the retention of the subsoil between the grass grown strips.

2. The method of cultivation which consists in subjecting a grass grown field to the removal of a plurality of substantially parallel strips of grass sod across said field to form subsoil bed strips, leaving remaining grass grown strips of substantially the same width, throughout the length of said field of a depth substantially equal to the depth of the removed sod, and of a width for the cultivation of a single row of plants in series parallel with the edge of the remaining grass grown strip, whereby the lowest part of a subsoil bed strip is below the adjacent grass grown strips adjacent thereto for forming water channels for the absorption of the water by the grass grown strips and for the retention of the subsoil between the grass grown strips.

References Cited in the file of this patent

UNITED STATES PATENTS

| Number | Name | Date |
|---|---|---|
| 2,035,839 | Salzman | Mar. 31, 1936 |

FOREIGN PATENTS

| Number | Country | Date |
|---|---|---|
| 576,885 | France | May 23, 1924 |
| 579,996 | France | Aug. 19, 1924 |

OTHER REFERENCES

Farmers' Bulletin No. 1776 published in 1937 by U. S. Dept. Agr., pages 4, 5, 8, 10, 24, 25, 26, 27, 31.

Farmers' Bulletin No. 1789, published in 1938 by U. S. Dept. Agr., pp. 52, 53, 58, 59.

Farmers' Bulletin No. 1981, published September 1946 by U. S. Dept. Agr., pp. 1, 2, 3, 10, 11, 45.

Garden Dictionary, published 1938, page 513, article on Mulch.